United States Patent
Sun et al.

(10) Patent No.: US 8,687,796 B2
(45) Date of Patent: Apr. 1, 2014

(54) METHOD AND ELECTRONIC DEVICE FOR IMPROVING COMMUNICATION QUALITY BASED ON AMBIENT NOISE SENSING

(75) Inventors: Ting-Wei Sun, Taoyuan (TW); Hann-Shi Tong, Taoyuan (TW); Wen-Liang Tseng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 167 days.

(21) Appl. No.: 12/950,266

(22) Filed: Nov. 19, 2010

(65) Prior Publication Data

US 2011/0135086 A1    Jun. 9, 2011

(30) Foreign Application Priority Data

Dec. 4, 2009  (TW) .................. 98141607 A

(51) Int. Cl.
*H04M 1/00* (2006.01)
*H04M 9/00* (2006.01)

(52) U.S. Cl.
USPC .................................................... 379/392.01

(58) Field of Classification Search
USPC ...................... 455/570; 379/392.01
See application file for complete search history.

(56) References Cited

U.S. PATENT DOCUMENTS

| | | | |
|---|---|---|---|
| 5,617,472 A | 4/1997 | Yoshida et al. | |
| 5,640,450 A | 6/1997 | Watanabe | |
| 5,920,834 A * | 7/1999 | Sih et al. | 704/233 |
| 6,185,298 B1 | 2/2001 | Hashimoto | |
| 2006/0217068 A1 | 9/2006 | Angelopoulos | |
| 2007/0078487 A1* | 4/2007 | Vaisnys et al. | 607/8 |
| 2009/0196429 A1* | 8/2009 | Ramakrishnan et al. | 381/26 |

FOREIGN PATENT DOCUMENTS

| | | |
|---|---|---|
| CN | 1625277 A | 6/2005 |
| CN | 1773847 A | 5/2006 |
| CN | 1783928 A | 6/2006 |
| CN | 101197870 A | 6/2008 |
| CN | 101488981 A | 7/2009 |
| EP | 0507482 A2 | 10/1992 |
| TW | 200822673 A | 5/2008 |
| WO | WO-2005071666 A1 | 8/2005 |

\* cited by examiner

*Primary Examiner* — Alexander Jamal
(74) *Attorney, Agent, or Firm* — Rabin & Berdo, P.C.

(57) ABSTRACT

A method and an electronic device for communication quality improvement based on ambient noise sensing are provided for improving communication quality. The method includes: during a call, dynamically setting a noise reduction mode in response to the varying of an ambient noise amount of at least one audio signal received by the electronic device. The setting step includes: during the call, dynamically determining whether the ambient noise amount indicates the needs of the application of noise reduction. If the ambient noise amount indicates the needs of the application of noise reduction, then one of a plurality of noise reduction levels is selected according to the ambient noise amount, and the noise reduction mode is set according to the selected noise reduction level, wherein the noise reduction levels include at least two levels corresponding to two different amounts of noise reduction.

12 Claims, 3 Drawing Sheets

METHOD AND ELECTRONIC DEVICE FOR IMPROVING COMMUNICATION QUALITY BASED ON AMBIENT NOISE SENSING

This application claims the benefit of Taiwan application Serial No. 98141607, filed Dec. 4, 2009, the subject matter of which is incorporated herein by reference.

BACKGROUND OF THE INVENTION

1. Field of the Invention

The application relates in general to a method for improving communication quality and an electronic device, and more particularly to a method and a mobile device for improving communication quality based on ambient noise sensing.

2. Description of the Related Art

During a call, the mobile device, such as a mobile phone, often experiences deteriorated communication quality due to the ambient noise. The caller's voice can be hardly heard if the ambient noise is too loud. Conventionally, an algorithm with fixed noise reduction is employed to reduce the level of the ambient noise, and a radical method for noise reduction can cover the needs of noise reduction in different environments.

However, the conventional method may affect the quality of the speaker's voice, deteriorate communication quality, and incur extra power consumption in a quiet environment.

SUMMARY OF THE INVENTION

The application is directed to a method and an electronic device for improving communication quality based on the ambient noise sensing. Based on the amount of the sensed ambient noise, during the call, the noise reduction mode is dynamically set, so that different levels of noise reduction are applied in response to the varying of the ambient noise amount. As indicated in the embodiments, communication quality is improved, and power consumption is saved.

According to a first aspect of the present application, a method for communication quality improvement based on ambient noise sensing is provided for improving communication quality of an electronic device. The method includes dynamically setting a noise reduction mode in response to the varying of an ambient noise amount of at least one audio signal received by the electronic device during a call. The setting step includes dynamically determining whether the ambient noise amount indicates the needs of the application of noise reduction during the call. If the ambient noise amount indicates the needs of the application of noise reduction, then one of a plurality of noise reduction levels is selected according to the ambient noise amount, and the noise reduction mode is set according to the selected noise reduction level, wherein the noise reduction levels include at least two levels corresponding to two different amounts of noise reduction.

According to a second aspect of the present application, an electronic device for communication and improving communication quality based on ambient noise sensing is provided. The electronic device includes at least one microphone, a voice processing module, and a processing module. The at least one microphone is used for sensing the voice to generate at least one output signal. The voice processing module, coupled to the at least one microphone, is used for processing at least one output signal so as to generate at least one audio signal. During a call, the processing module is used for dynamically setting a noise reduction mode in response to the varying of an ambient noise amount of at least one audio signal. During the call, the processing module dynamically determines whether the ambient noise amount indicates the needs of the application of noise reduction. If the ambient noise amount indicates the needs of the application of noise reduction, then the processing module selects one of a plurality of noise reduction levels according to the ambient noise amount and sets the noise reduction mode according to the selected noise reduction level, wherein the noise reduction levels include at least two levels corresponding to two different amounts of noise reduction.

According to a third aspect of the present application, an electronic device for communication and improving communication quality based on ambient noise sensing is provided. The electronic device includes at least one microphone and a voice processing module. The at least one microphone is used for sensing a voice to generate at least one output signal. The voice processing module, coupled to at least one microphone, is used for processing at least one output signal so as to generate an ambient noise amount. During a call, the voice processing module is used for dynamically setting a noise reduction mode in response to the varying of an ambient noise amount. During the call, the voice processing module dynamically determines whether the ambient noise amount indicates the needs of the application of noise reduction. If the ambient noise amount indicates the needs of the application of noise reduction, then the voice processing module selects one of a plurality of noise reduction levels according to the ambient noise amount and sets the noise reduction mode according to the selected noise reduction level, wherein the noise reduction levels include at least two levels corresponding to two different amounts of noise reduction.

The above and other aspects of the application will become apparent from the following detailed description of the preferred but non-limiting embodiments. The following description is made with reference to the accompanying drawings.

DETAILED DESCRIPTION OF THE INVENTION

The application provides a method for improving communication quality based on ambient noise sensing. The method is adaptable to an electronic device capable of receiving audio signals. The electronic device can be a mobile computation device, such as a notebook computer, a portable phone, a web phone device, or a vehicle hand-free device. The noise reduction mode is dynamically set according to the amount of sensed ambient noise so that different levels of noise reduction can be applied in response to the varying of the ambient noise amount.

Figure 1:
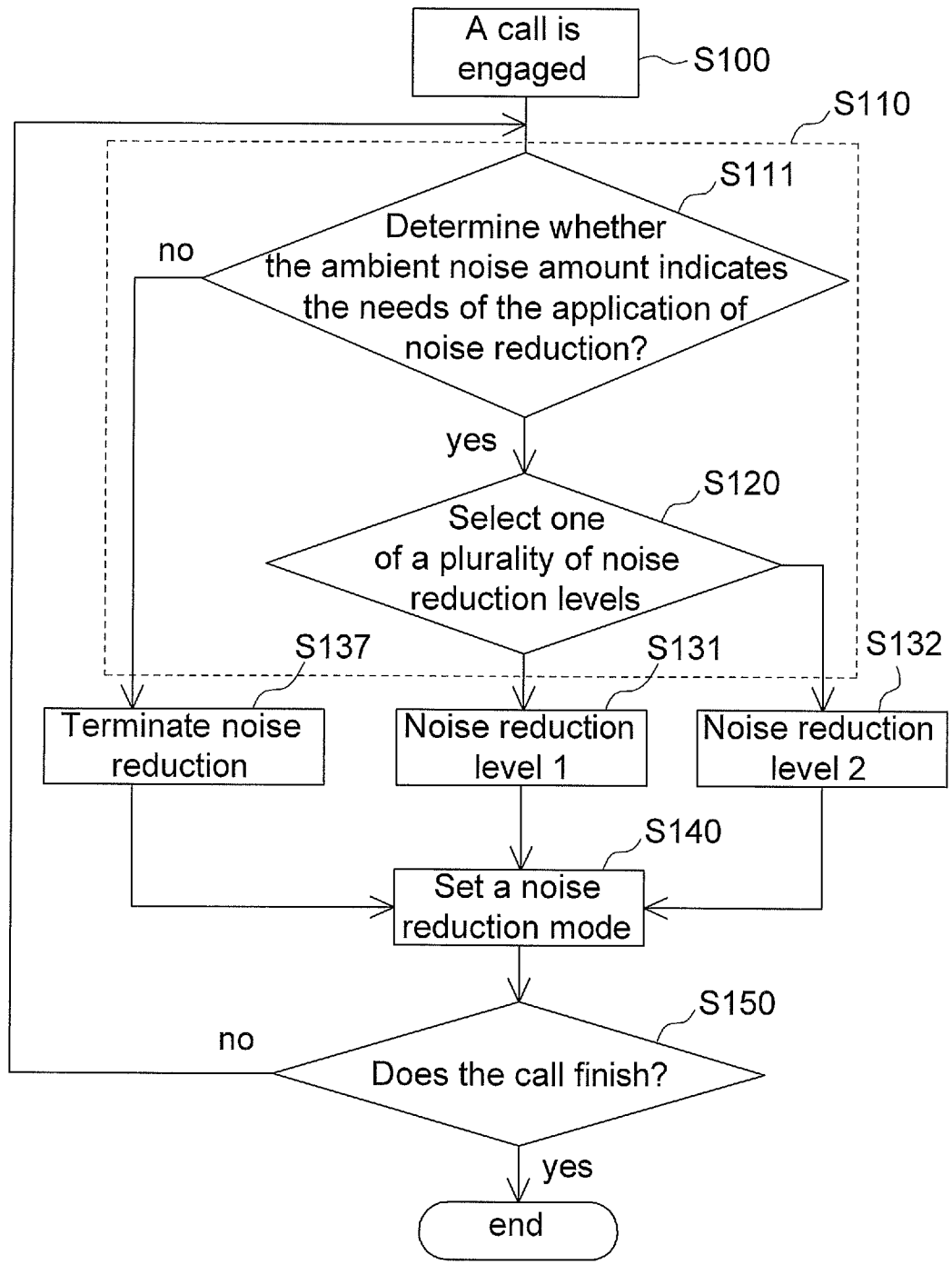
FIG. 1 shows a flowchart of a method for improving communication quality based on ambient noise sensing according to an embodiment of the application.

FIG. 1 shows a flowchart of a method for improving communication quality based on ambient noise sensing according to an embodiment of the application. The method of FIG. 1 illustrates an embodiment in which a noise reduction mode is dynamically set in response to the varying of an ambient noise amount when processing a call, wherein the ambient noise amount is estimated according to one or many audio signals, and the audio signal can be outputted by a microphone of a mobile device. In FIG. 1, step S100 indicates that a call is engaged, wherein the call can be an incoming call or a send call. In step S110, the setting of the noise reduction mode during a call is determined. In step S111, whether the ambient noise amount indicates the needs of the application of the noise reduction is determined. In step S120, if the application of noise reduction is needed, then one of a plurality of noise reduction levels is selected according to the ambient noise amount, wherein the noise reduction levels include at least two levels corresponding to two different amounts of noise reduction. For example, if the mobile device is exposed to a high ambient noise, then in step S120, a corresponding noise reduction level 2 (such as the block of S132) is selected according to the ambient noise amount, wherein the corresponding noise reduction is 20 dB. If the mobile device is exposed to an ambient noise being relatively low, then in step S120, a corresponding noise reduction level 1 (such as the block of S131) is selected according to the ambient noise amount, wherein the corresponding noise reduction is 10 dB. Next, in step S140, a noise reduction mode is set according to the selected noise reduction level. If the ambient noise amount does not indicate the application of noise reduction, then the method proceeds to step S137 in which the noise reduction mode is set to terminate noise reduction. That is, the noise reduction is terminated or disabled. Afterwards, the method proceeds to step S150, if the call finishes, then the method terminates, and if the call is still in process, then the above steps are repeated until the call finishes.

In step S110, the noise reduction mode is determined according to the varying of the ambient noise amount. For example, whether the application of noise reduction is needed is dynamically determined by determining whether the ambient noise amount falls within a first range (such as the range larger than −70 dB). The first range includes a plurality of sub-ranges. For example, the sub-range ranging −70 to −50 dB corresponds to the noise reduction level 1, and the sub-range being larger than or equal to −50 dB corresponds to the noise reduction level 2. One of the noise reduction levels is selected according to within which sub-range of the first range does the ambient noise amount fall. The above example is merely an exemplification of the method, not for limiting the implementation of the embodiment. Anyone of ordinary skill in the art will understand that step S110 of dynamically determining the noise reduction mode according to the varying of the ambient noise amount can also be implemented in other ways. For example, the determination of the noise reduction level can be based on a threshold or the increment or decrease in the ambient noise amount.

In an embodiment, the ambient noise amount is obtained from the average value of an ambient noise level of at least one audio signal in a first time interval. Let the first time interval be 3 seconds. When a call begins, the above steps are performed according to the definition of the ambient noise amount. In another embodiment, after a certain period of time, the ambient noise amount can be changed to the average value of an ambient noise level of at least one audio signal in a second time interval such as 30 seconds. According to the spirit of the embodiment of FIG. 1, the noise reduction mode can be dynamically set according to the ambient noise amount, so that the method of the application can have different implementations, and a smart type noise reduction can be achieved.

Figure 2:
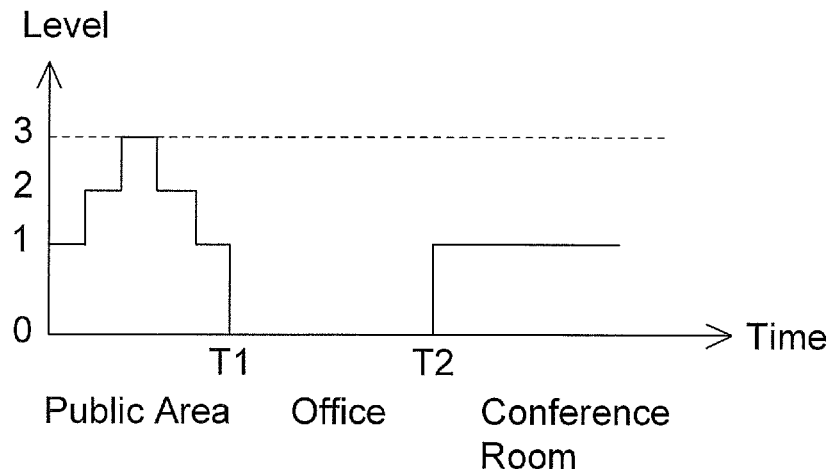
FIG. 2 shows a schematic diagram of dynamically setting the noise reduction mode according to an embodiment of the application.

Referring to FIG. 2, a practical example is illustrated. For example, at the beginning of a call, the ambient noise amount is obtained from the average value of an ambient noise level within a time interval of every 3 seconds. Meanwhile, the user uses the mobile device such as a mobile phone in a public area. Since the ambient noise is loud and varying, within the time of T1 (such as 15 seconds), the level of the noise reduction is set for 5 times, that is, from level 1 to level 3 (the maximum level), and then back to level 1. After 15 seconds, the ambient noise amount is obtained from the average value of an ambient noise level within a time interval of every 30 seconds. Meanwhile, the user enters a quiet office and continues the call, the ambient noise is low, and the level of noise reduction is set to level 0; that is, noise reduction is terminated. Then, at time point T2 (such as after 2 minutes), the user continues the call and enters a conference room. Since someone is preparing setting of the presentation facility in the conference room, the noise reduction level is set to level 1. In FIG. 2, compared with the conventional method (in dotted lines) which adopts a fixed noise reduction level (such as level 3), the embodiment of the application sets appropriate noise reduction by dynamically applying different levels of noise reduction, hence effectively reducing power consumption.

Figure 3:
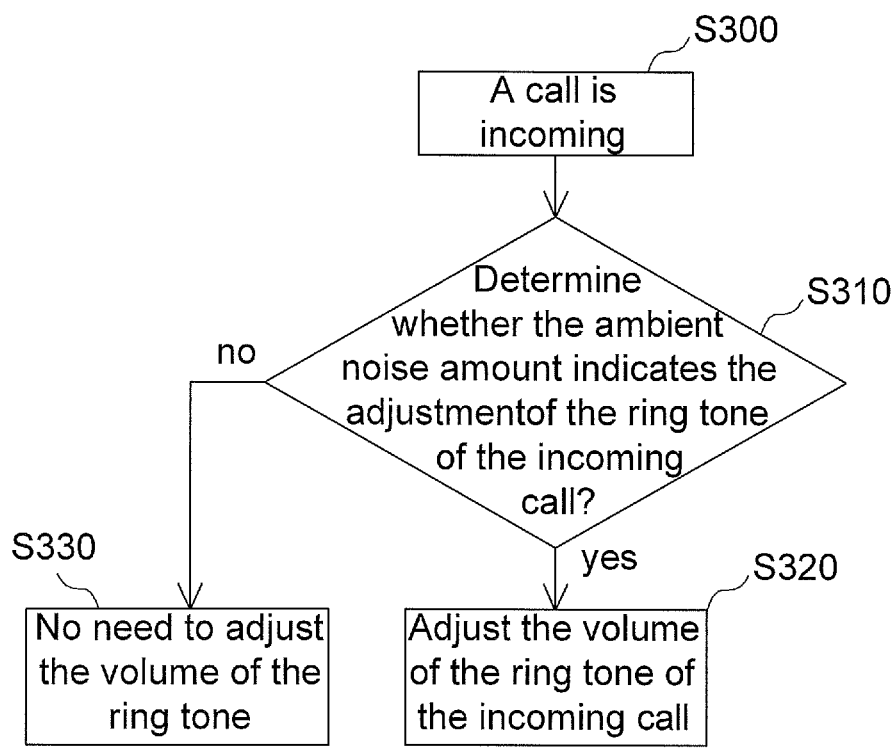
FIG. 3 shows a flowchart of an embodiment of controlling the volume of the ring tone of an incoming call according to the ambient noise amount before the call is answered.

In other embodiments, before an incoming call is answered, the volume of the ring tone of the incoming call is controlled according to the ambient noise amount. As indicated in FIG. 3, step S300 indicates that there is an incoming call before the application of the method as in FIG. 1. At this time, step S310 is performed in response to the varying of the ambient noise amount so as to determine whether to adjust the volume of the ring tone of the incoming call. If the ambient noise amount does not indicate the adjustment of the ring tone of the incoming call, the volume of the ring tone of the incoming call is not adjusted, as indicated in step S330. If the ambient noise amount indicates the adjustment of the ring tone of the incoming call, then the method proceeds to step S320 to adjust the volume of the ring tone of the incoming call. For example, in step S310, if the ambient noise amount is larger than a threshold such as 10 dB, then the volume of the ring tone of the incoming call is doubled, so that the user can clearly hear the ring tone of the incoming call.

Figure 4:
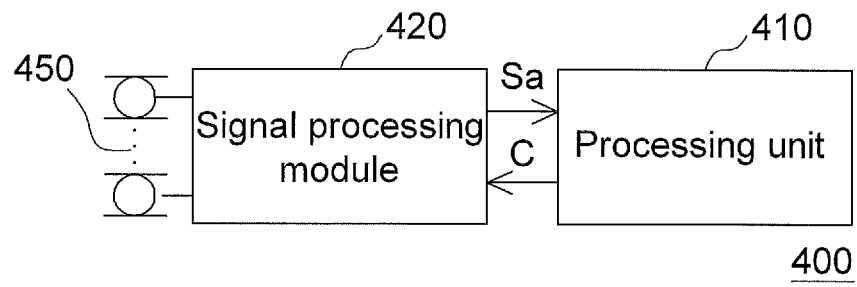
FIG. 4 shows a system block diagram according to an embodiment of the application.

The method of the embodiments of the application is adaptable to any electronic devices capable of receiving audio signals. Referring to FIG. 4, a system block diagram according to an embodiment of the application is shown. FIG. 4 shows a part of an electronic device 400 which implements the method of the application. The electronic device 400, such as a mobile computation device, a portable phone, a web phone device or a vehicle hand-free device, includes a processing unit 410, a signal processing module 420, and one or many microphones 450. The signal processing module 420 receives an analog signal from the microphone 450, wherein the analog signal is converted into at least one digital signal Sa or many digital signals through analog-digital conversion. The processing unit 410 processes the digital signal Sa, dynamically determines noise reduction according to the method of the application, and outputs a control signal C which controls the signal processing module 420 to set the noise reduction mode. In the present embodiment, the processing unit 410 performs the method of the embodiment of the application to control the signal processing module 420 with noise reduction function.

Figure 5:
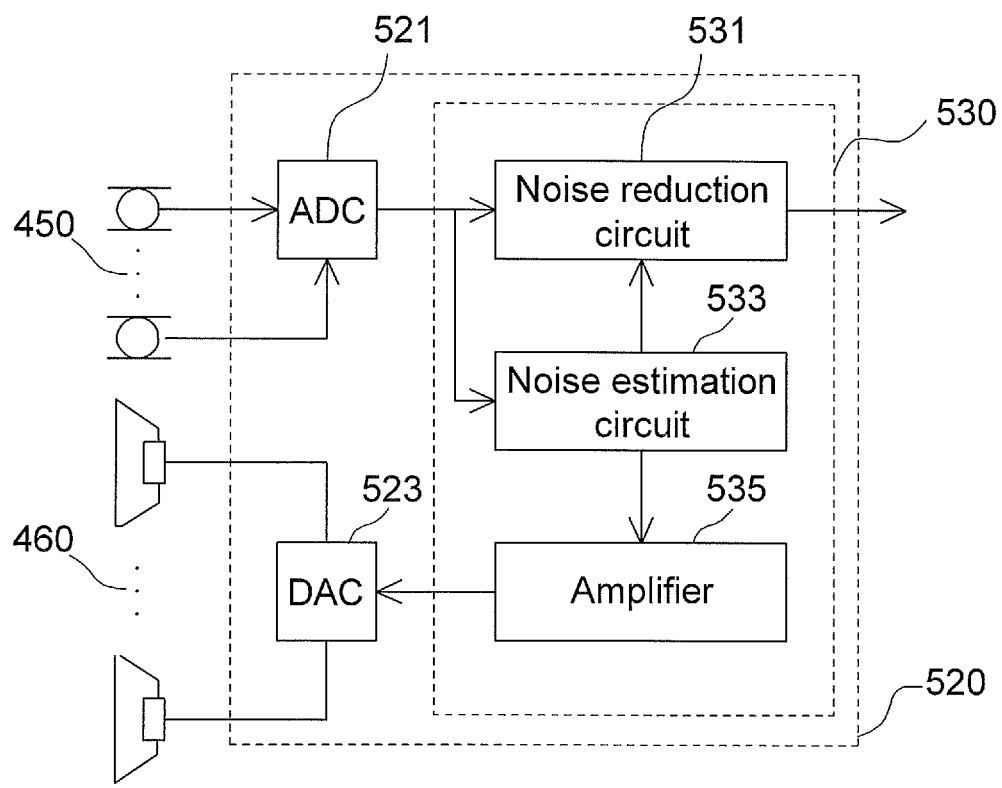
FIG. 5 shows a block diagram of a signal processing module according to an embodiment of the application.

In another embodiment, the signal processing module 520 of FIG. 5, such as an audio codec, includes an analog-to-digital converter (ADC) 521 used for connecting one or many microphones 450, and a digital-to-analog converter (DAC) 523 used for connecting one or many speakers 460. The signal processing module 520 further includes a digital signal processor 530, which includes a noise reduction circuit 531, a noise estimation circuit 533, and an amplifier 535. The embodiment of FIG. 5 is different from the embodiment of FIG. 4 in that the signal processing module 520 controls the noise reduction circuit 531 by the method of the embodiment of the application. The noise estimation circuit 533 estimates the current ambient noise amount according to one or many digital audio signals received from the analog-digital converter 521. The noise reduction mode is dynamically set according to the method of the embodiment of the application. That is, the noise reduction circuit 531 is controlled. FIG. 5 is only for exemplification, not for limiting the implementation of the application. The signal processing module with noise reduction function or the digital signal processor can be programmed to perform different noise reduction methods. According to the embodiment of the method of the application, noise reduction mode is dynamically set according to the ambient noise amount, and the digital signal processor can be used for implementing the embodiment of the application.

When an incoming call is received, the circuit of FIG. 5, according to the method illustrated in FIG. 3, determines whether to set the amplifier 535 to control the volume of the ring tone of the incoming call according to the ambient noise amount obtained through the noise estimation circuit 533. The signal processing module 420 of FIG. 4 can connect one or many speakers such as the speakers 460 of FIG. 5. The processing unit 410 adjusts the volume of the ring tone of the incoming call by controlling the amplification function of the signal processing module 420 according to the method of FIG. 3.

The ambient noise amount can be estimated according to the conventional method. For example, before the user is engaged in a call, the minimum or the average of the volume of the voice recorded by a microphone can be regarded as an ambient noise. During the call, the minimum or the average volume of the voice recorded within a period of time can also be regarded as an ambient noise. However, the approach to estimation of the ambient noise with one microphone during conversation would be resulted in the noise estimation being affected due to the interference of the voice.

In another implementation, at least two microphones are used for obtaining the ambient noise amount with more accurate estimation. For example, in a mobile phone, a microphone MIC1 is used for receiving the user's voice during a call, and an extra microphone MIC2 is used for sensing the noise. The microphone MIC1 is closer to the user's mouth than the microphone MIC2 which is separated from the microphone MIC1 by a distance. During the call, the microphone MIC2 receives less voice than the microphone MIC1. Comparing the voice received by the microphone MIC1 with the voice received by the microphone MIC2, the one with a larger amount (higher volume) of voice (that is, the one received by microphone MIC1) is determined as the voice receiving microphone. Thus, the voice can be filtered and calculated, and the ambient noise can be obtained from the microphone MIC2. Likewise, the greater the number of microphones that are used (for example 4 or 7 might be used), the better the estimation will be.

According to the method and the device for improving communication quality based on ambient noise sensing disclosed in the above embodiments of the application, the noise reduction mode is dynamically set according to the varying of the ambient noise amount, so that the noise reduction is appropriately set and power consumption is effectively reduced.

While the application has been described by way of examples and in terms of preferred embodiments, it is to be understood that the application is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method based on ambient noise sensing for improving the communication quality of an electronic device, wherein the method comprises:
    during a call, dynamically setting a noise reduction mode in response to a varying amount of ambient noise in a plurality of audio signals received by a plurality of microphones separately disposed in the electronic device, wherein the setting step comprises:
        during the call, comparing the audio signals received by the microphones to determine the amount of ambient noise;
        dynamically determining whether the amount of ambient noise indicates a need for an application of noise reduction; and
        selecting one of a plurality of noise reduction levels according to the determined amount of ambient noise and setting the noise reduction mode according to the selected noise reduction level if the determined amount of ambient noise indicates a need for the application of noise reduction, wherein the noise reduction levels comprise at least two levels corresponding to two different amounts of noise reduction;
    wherein during the call, the determined amount of ambient noise is based on an average value of an ambient noise level of the audio signals within a first time interval, and after a certain period of time, the determined amount of ambient noise is changed to an average value of the ambient noise level of the audio signals within a second time interval, wherein the second time interval is different from the first time interval.

2. The method according to claim 1, wherein the call is an incoming call, and the method further comprises: before the incoming call is answered, setting a volume of a ring tone of the incoming call in response to the varying of the determined amount of ambient noise in the audio signals received by the electronic device.

3. The method according to claim 2, wherein if the determined amount of ambient noise is larger than a threshold, then the volume of the ring tone of the incoming call is increased.

4. The method according to claim 1, wherein the call is an incoming call or a send call.

5. The method according to claim 1, wherein if the determined amount of ambient noise does not indicate a need for the application of noise reduction, then the noise reduction mode is set to terminate noise reduction.

6. The method according to claim 1, wherein whether the application of noise reduction is needed is dynamically determined by determining whether the determined amount of ambient noise falls within a first range, wherein the first range comprises a plurality of sub-ranges each corresponding to one of the noise reduction levels, and one of the noise reduction levels is selected by determining within which sub-range of the first range the determined amount of ambient noise falls.

7. An electronic device for improving communication quality based on ambient noise sensing, wherein the electronic device comprises:

a plurality of microphones for sensing a sound to generate a plurality of output signals;

a voice processing module coupled to the microphones for processing the output signals so as to generate a plurality of audio signals; and a processing module, wherein during a call, the processing module compares the audio signals to determine an amount of ambient noise, and dynamically sets a noise reduction mode in response to a varying of the determined amount of ambient noise in the audio signals;

wherein, during the call, the processing module dynamically determines whether the determined amount of ambient noise indicates a need for an application of noise reduction, and if the determined amount of ambient noise indicates a need for the application of noise reduction, then the processing module selects one of a plurality of noise reduction levels according to the determined amount of ambient noise and sets the noise reduction mode according to the selected noise reduction level, and the noise reduction levels comprise at least two levels corresponding to two different amounts of noise reduction;

wherein during the call, the determined amount of ambient noise is based on an average value of an ambient noise level of the audio signals within a first time interval, and after a certain period of time, the determined amount of ambient noise is changed to an average value of the ambient noise level of the audio signals within a second time interval, wherein the second time interval is different from the first time interval.

8. The electronic device according to claim 7, wherein the call is an incoming call, and before the incoming call is answered, the processing module sets a volume of a ring tone of the incoming call in response to the varying of the determined amount of ambient noise.

9. The electronic device according to claim 7, wherein the microphones comprise a first microphone and a second microphone, the first microphone is used for receiving a voice of the call and is separated from the second microphone by a distance, and the amount of ambient noise is determined from the output signals of the first microphone and the second microphone.

10. An electronic device for improving communication quality based on ambient noise sensing, wherein the electronic device comprises:

a plurality of microphones for sensing a sound to generate a plurality of output signals; and a voice processing module coupled to the microphones for comparing the output signals so as to determine an amount of ambient noise;

wherein, during a call, the voice processing module is used for dynamically setting a noise reduction mode in response to a varying of the determined amount of ambient noise;

wherein during the call, the voice processing module dynamically determines whether the determined amount of ambient noise indicates a need for an application of noise reduction, and if the determined amount of ambient noise indicates the need an application of noise reduction, then the voice processing module selects one of a plurality of noise reduction levels according to the determined amount of ambient noise and sets the noise reduction mode according to the selected noise reduction level, and the noise reduction levels comprise at least two levels corresponding to two different amounts of noise reduction;

wherein during the call, the determined amount of ambient noise is based on an average value of an ambient noise level of the audio signals within a first time interval, and after a certain period of time, the determined amount of ambient noise is changed to an average value of the ambient noise level of the audio signals within a second time interval, wherein the second time interval is different from the first time interval.

11. The electronic device according to claim 10, wherein the call is an incoming call, and before the incoming call is answered, the voice processing module sets a volume of a ring tone of the incoming call in response to the varying of the determined amount of ambient noise.

12. The electronic device according to claim 10, wherein the microphones comprise a first microphone and a second microphone, the first microphone is used for receiving a voice of the call and is separated from the second microphone by a distance, and the amount of ambient noise is determined from the output signals of the first microphone and the second microphone.

* * * * *